US012434616B2

(12) United States Patent
Jones

(10) Patent No.: US 12,434,616 B2
(45) Date of Patent: Oct. 7, 2025

(54) GRAFFITI REMOVAL ASSEMBLY

(71) Applicant: Wilbert Jones, Culver City, CA (US)

(72) Inventor: Wilbert Jones, Culver City, CA (US)

( * ) Notice: Subject to any disclaimer, the term of this patent is extended or adjusted under 35 U.S.C. 154(b) by 300 days.

(21) Appl. No.: 18/206,804

(22) Filed: Jun. 7, 2023

(65) Prior Publication Data

US 2024/0409019 A1 Dec. 12, 2024

(51) Int. Cl.

*B60P 3/30* (2006.01)
*B08B 1/12* (2024.01)
*B08B 3/04* (2006.01)

(52) U.S. Cl.

CPC *B60P 3/30* (2013.01); *B08B 1/12* (2024.01); *B08B 3/04* (2013.01)

(58) Field of Classification Search

CPC ... E04G 23/002; B05B 13/005; B66F 11/044; B66F 11/046; A47L 11/408; A47L 11/4083; A47L 11/38; B08B 3/022; B44D 3/16; B44D 3/162

See application file for complete search history.

(56) References Cited

U.S. PATENT DOCUMENTS 3,101,175 A 8/1963 Brown
3,160,347 A 12/1964 Ackley et al.
3,243,123 A 3/1966 Inghram et al.
3,439,372 A * 4/1969 Collier .................. B66F 11/046 451/354
3,904,117 A * 9/1975 Adams, Jr. ............. A62C 27/00 239/146
4,723,733 A 2/1988 McClinchy
D701,357 S 3/2014 Barrios
2006/0188332 A1 8/2006 Anderson
2010/0032500 A1* 2/2010 Righini ..................... B05B 1/18 239/393
2013/0236644 A1* 9/2013 Logan ....................... B05B 3/12 118/313
2024/0389816 A1* 11/2024 Li ............................. A47L 1/02

FOREIGN PATENT DOCUMENTS

FR 3037293 12/2015

* cited by examiner

*Primary Examiner* — Tuongminh N Pham

(57) ABSTRACT

A graffiti removal assembly includes a vehicle that has a cargo bay and a roof. A robotic arm is movably mounted on the roof of the vehicle and the robotic arm is positionable in a variety of orientations with respect to the vehicle to direct the robotic arm toward a wall. A service head is pivotally attached to the robotic arm to position the service head adjacent to the wall when the robotic arm is directed toward the wall. A scrubbing unit is attached to the scrub panel of service head for scrubbing graffiti from the wall. A painting and spraying unit is attached to the paint and spray panel of the service head to apply paint onto the wall for covering the graffiti.

15 Claims, 7 Drawing Sheets

GRAFFITI REMOVAL ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to graffiti devices and more particularly pertains to a new graffiti device for removing or covering graffiti on a wall. The device includes a vehicle and a robotic arm movably disposed on a roof of the vehicle. The device includes a service head that is pivotally attached to the robotic arm. The device includes a scrubbing unit attached to the service head and a painting and spraying unit attached to the service head. The scrubbing unit scrubs the graffiti from the wall and the painting and spraying unit paints over the graffiti.

(2) Description of Related Art Including Information Disclosed Under 37 CFR 1.97 and 1.98

The prior art relates to graffiti devices including a road striping machine that includes a paint nozzle for applying paint to a roadway and an electronic sight for guiding the paint nozzle. The prior art discloses a road painting device that includes a vehicle, a boom pivotally disposed on a roof of the vehicle which can be directed toward a roadway and a paint nozzle disposed on the boom for spraying paint onto the roadway. The prior art discloses a variety of paint spraying devices that each at least includes a vehicle, a telescopic boom movably disposed on the boom and a bucket on the boom for supporting a service worker.

BRIEF SUMMARY OF THE INVENTION

An embodiment of the disclosure meets the needs presented above by generally comprising a vehicle that has a cargo bay and a roof. A robotic arm is movably disposed on the roof of the vehicle and the robotic arm is positionable in a variety of orientations with respect to the vehicle thereby facilitating the robotic arm to be directed toward a wall. A service head is pivotally attached to the robotic arm thereby facilitating the service head to be positioned adjacent to the wall when the robotic arm is directed toward the wall. A scrubbing unit is attached to the scrub panel of service head for scrubbing graffiti from the wall. A painting and spraying unit is attached to the paint and spray panel of the service head to apply paint onto the wall for covering the graffiti.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
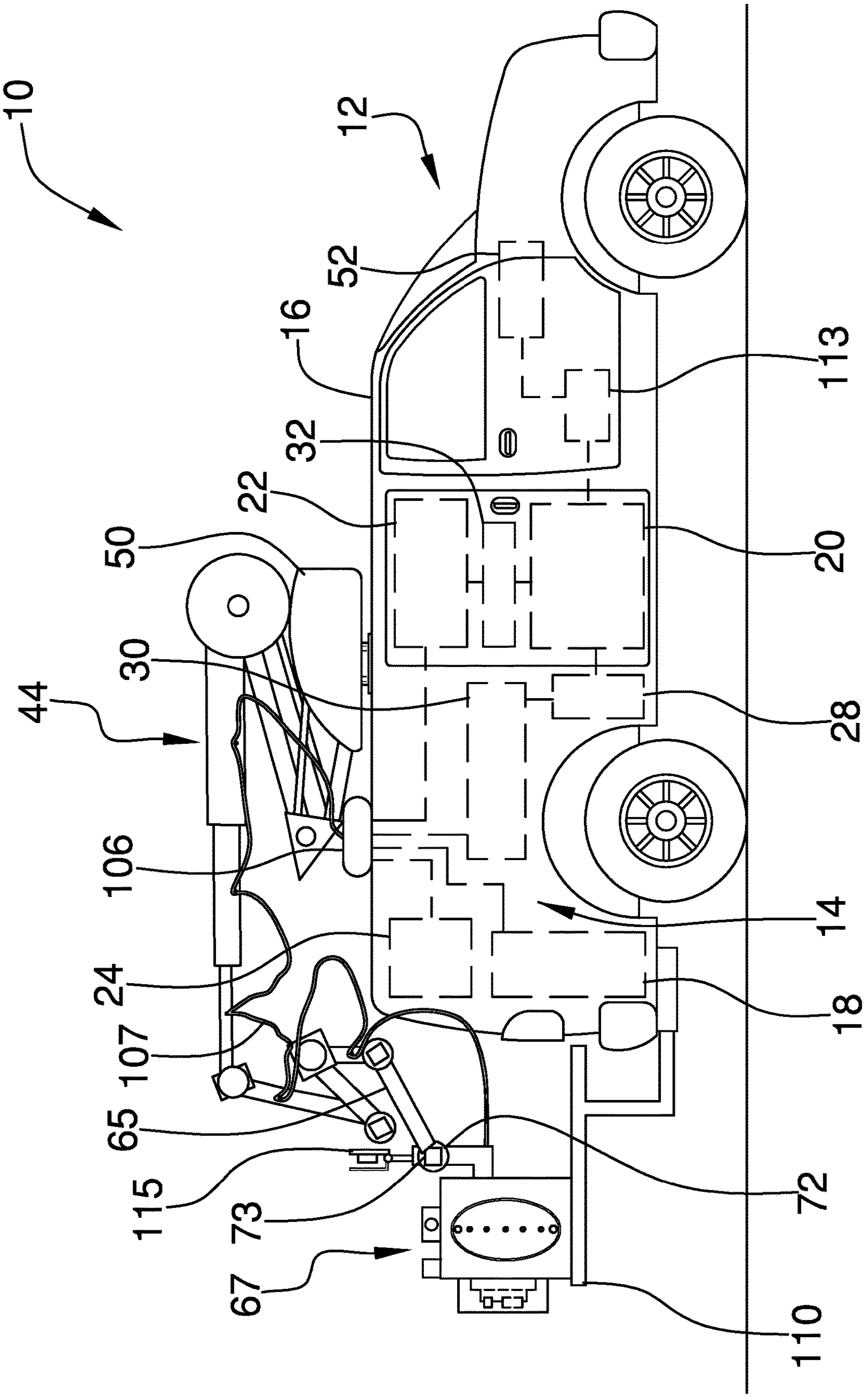
FIG. 1 is a left side phantom view of a graffiti removal assembly according to an embodiment of the disclosure.
Figure 2:
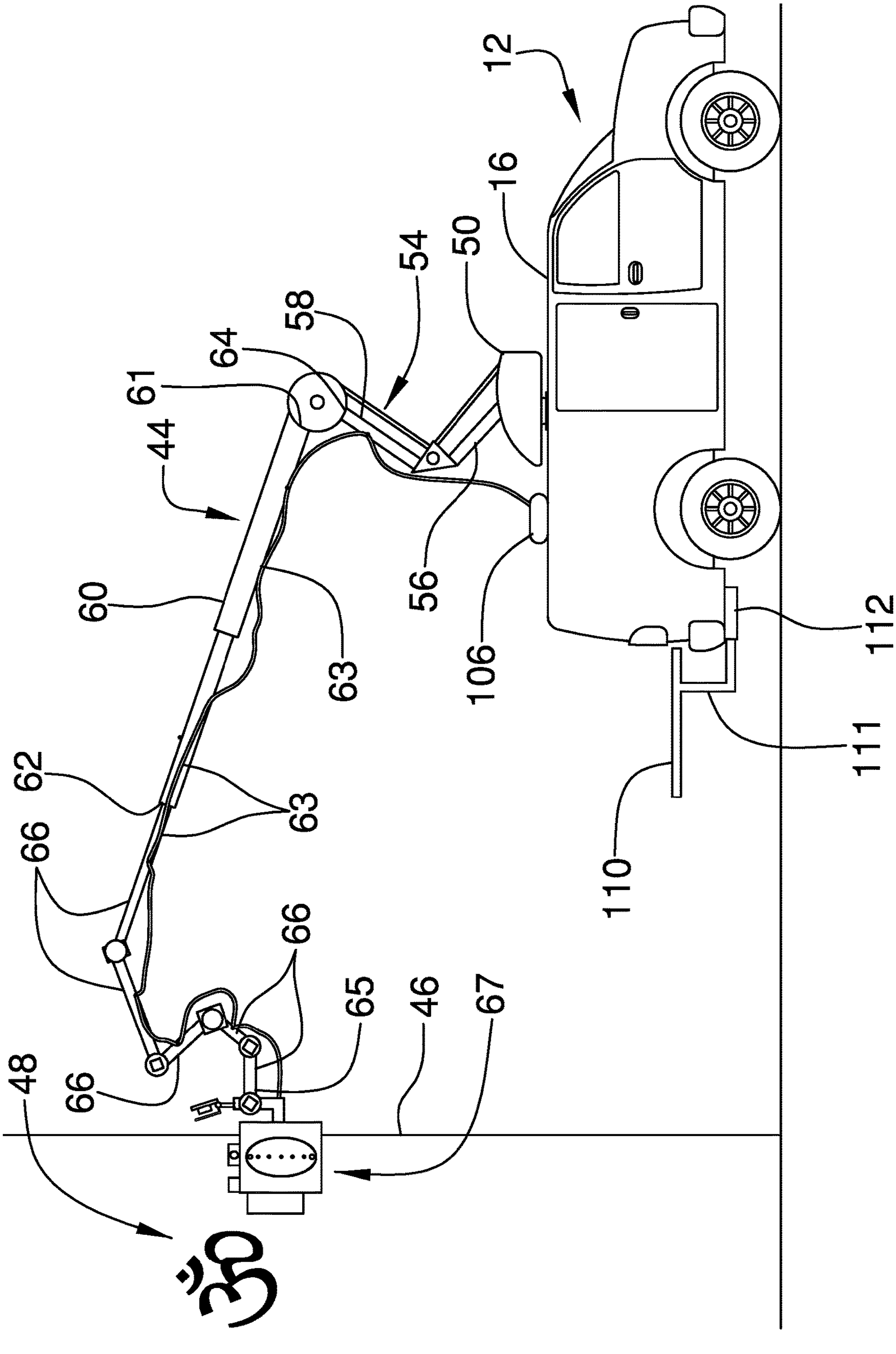
FIG. 2 is a left side view of an embodiment of the disclosure showing a robotic arm being deployed from a vehicle.
Figure 3:
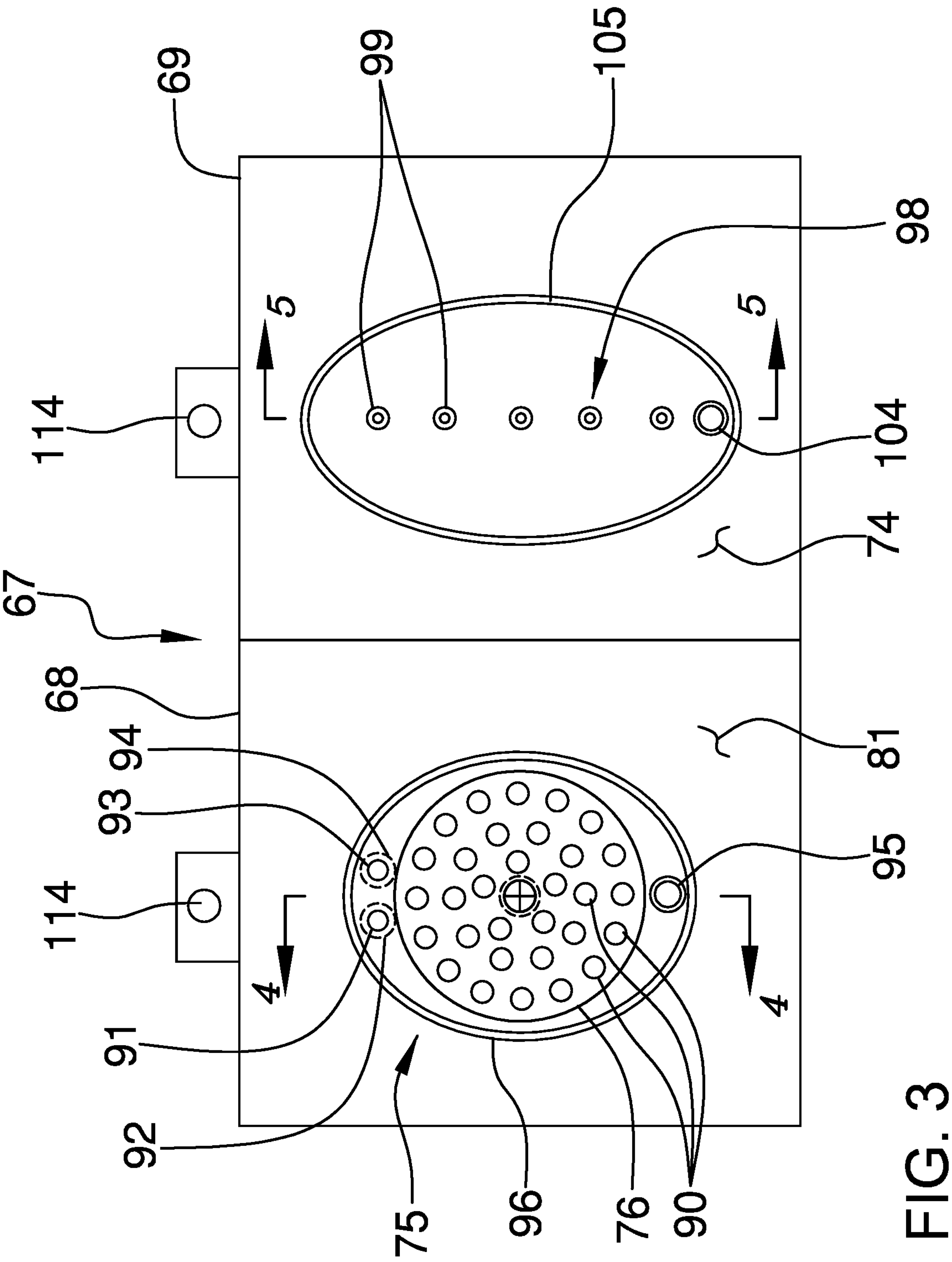
FIG. 3 is a front view of service head of an embodiment of the disclosure.
Figure 5:
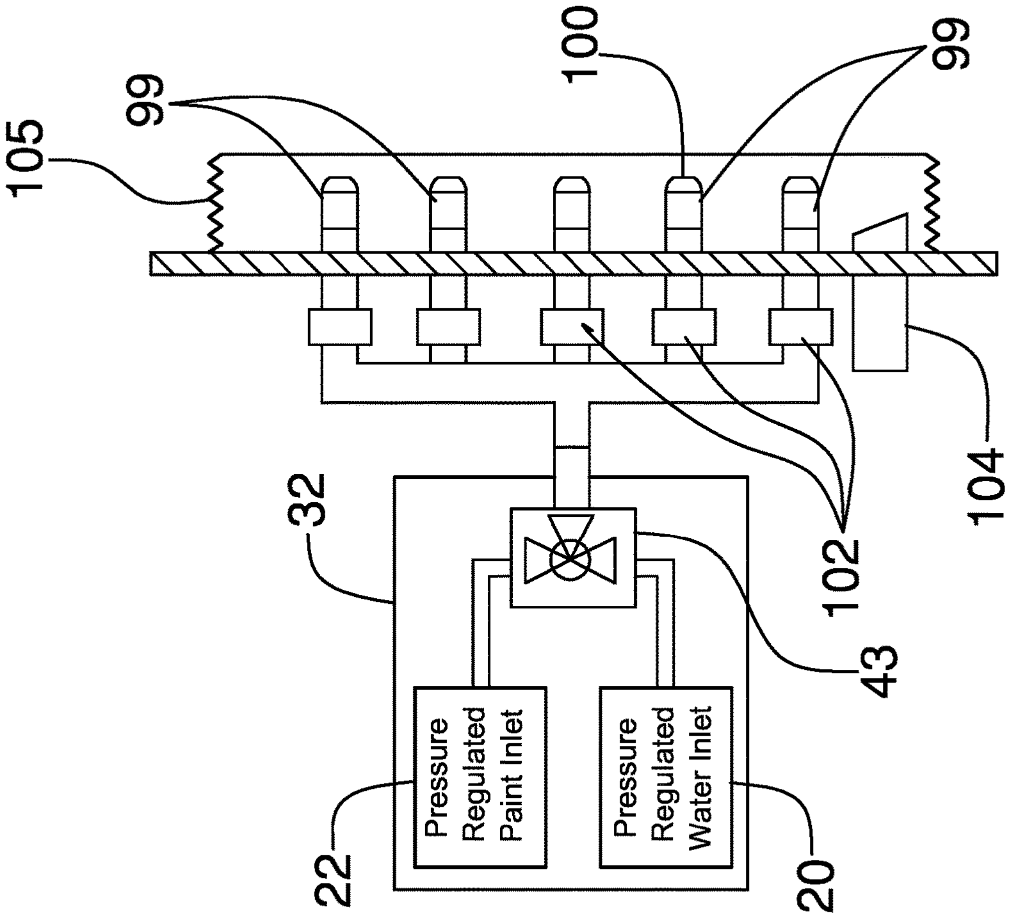
FIG. 5 is a cross sectional view taken along line 5-5 of FIG. 3 of an embodiment of the disclosure.
Figure 4:
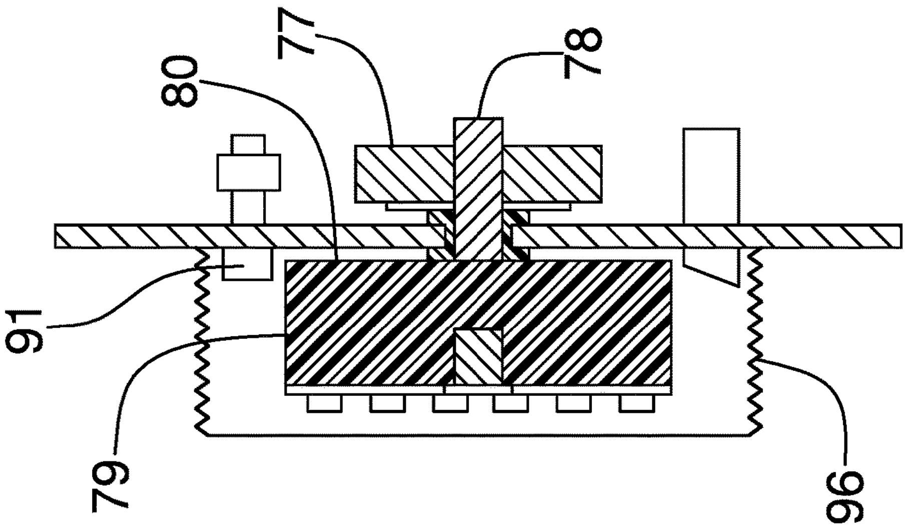
FIG. 4 is a cross sectional view taken along line 4-4 of FIG. 3 of an embodiment of the disclosure.
Figure 6:
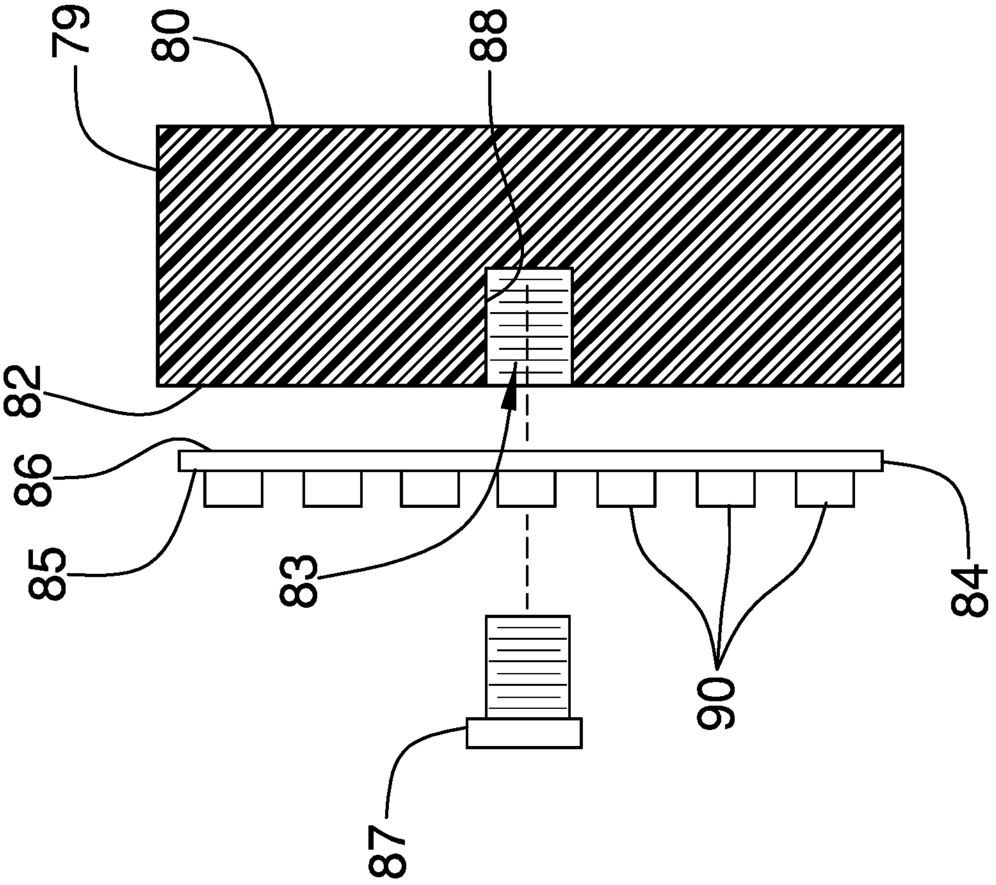
FIG. 6 is an exploded view of a scrubbing unit of an embodiment of the disclosure.
Figure 7:
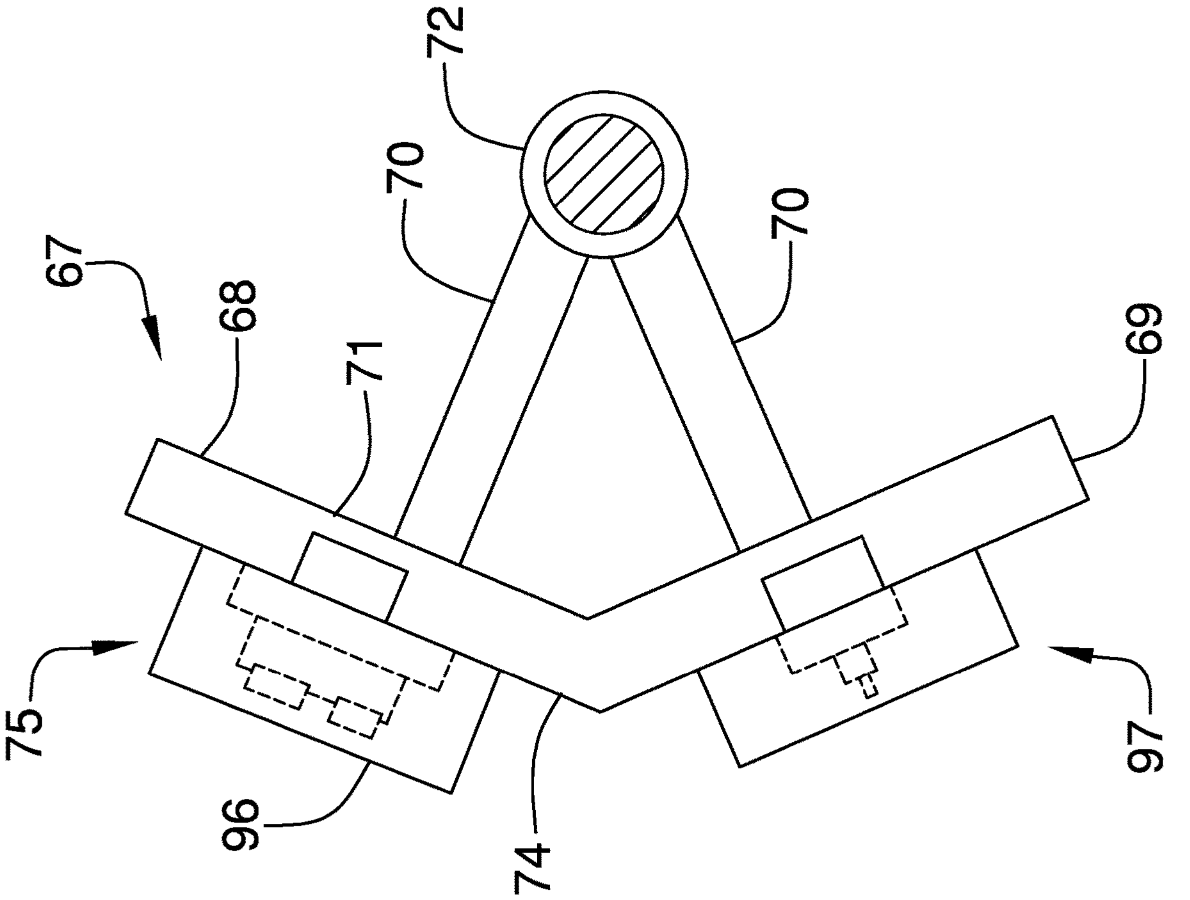
FIG. 7 is a top phantom view of service head of an embodiment of the disclosure.
Figure 8:
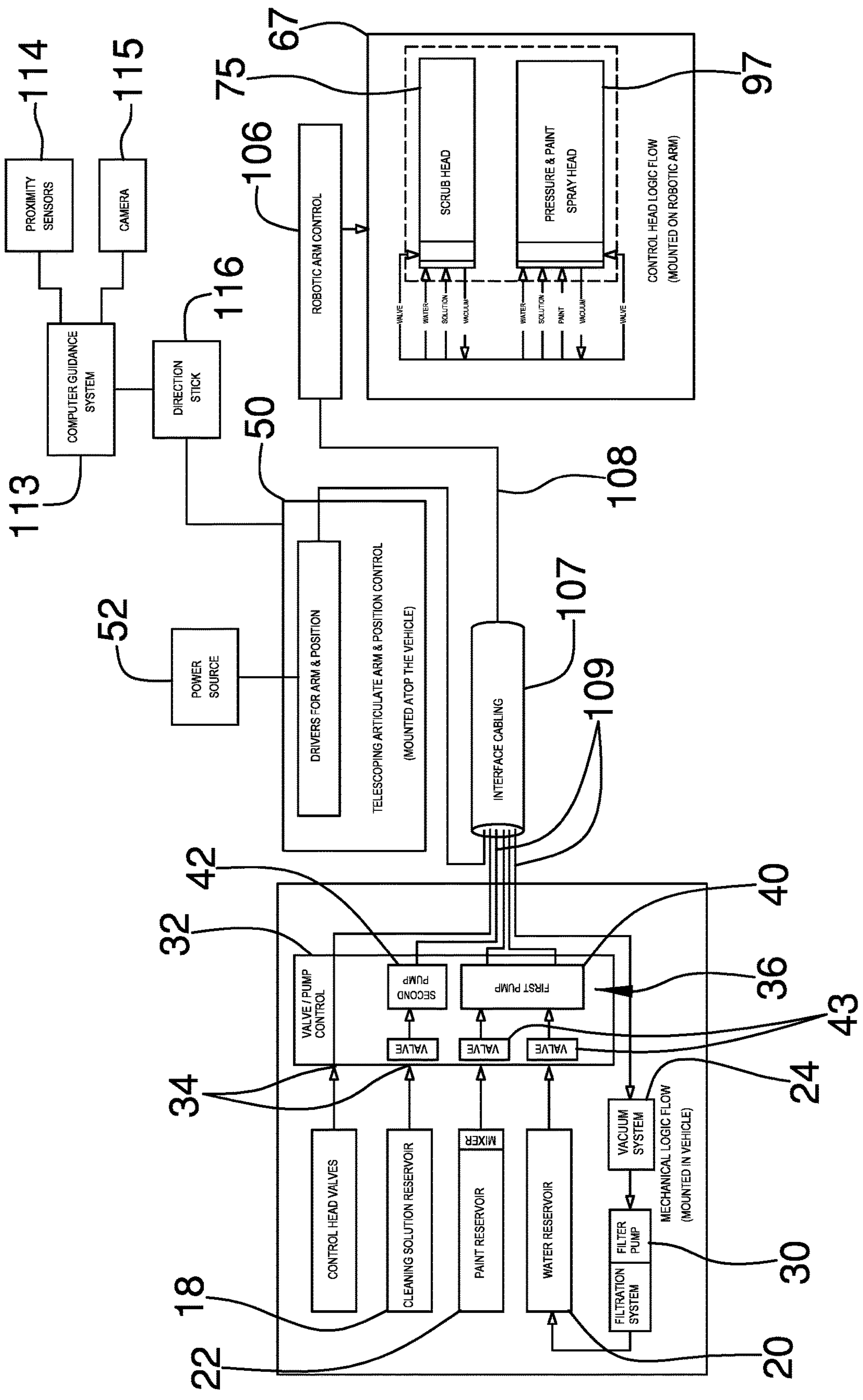
FIG. 8 is a schematic view of an embodiment of the disclosure.

With reference now to the drawings, and in particular to FIGS. 1 through 8 thereof, a new graffiti device embodying the principles and concepts of an embodiment of the disclosure and generally designated by the reference numeral 10 will be described.

As best illustrated in FIGS. 1 through 8, the graffiti removal assembly 10 generally comprises a vehicle 12 that has a cargo bay 14 and a roof 16. The vehicle 12 may comprise a cargo van or other similar type of motorized vehicle that is drivable on public roadways and which has a cargo bay. A detergent reservoir 18 is positioned within the cargo bay 14 of the vehicle 12 and the detergent reservoir 18 contains a liquid detergent. A water reservoir 20 is positioned within the cargo bay 14 of the vehicle 12 and the water reservoir 20 contains water. Additionally, a paint reservoir 22 is positioned within the cargo bay 14 of the vehicle 12 and the paint reservoir 22 contains a liquid paint.

The liquid paint may be exterior latex paint, for example, or other similar type of paint that is commonly applied to the exterior of buildings. Furthermore, the paint reservoir 22 may contain a variety of colors of liquid paint and the paint reservoir 22 may include an electronic mixer that can mix selected ones of the variety of colors of liquid paint.

A vacuum unit 24 is positioned within the cargo bay 14 of the vehicle 12 and the vacuum unit 24 may comprise an electric vacuum or the like. An air compressor 28 is positioned within the cargo bay 14 of the vehicle 12 and the air compressor 28 may comprise an electric air compressor or the like. A filtration unit 30 is positioned within the cargo bay 14 of the vehicle 12 and the filtration unit 30 may include a debris filter, a variety of chemical filters and other types of filtration capabilities for rendering contaminated water safe for discharge into municipal sewer systems.

A valve control unit 32 is positioned within the cargo bay 14 of the vehicle 12 and the valve control unit 32 has a plurality of inputs 34. Each of the inputs 34 of the valve control unit 32 is in fluid communication with a respective one of the detergent reservoir 18, the water reservoir 20 and the paint reservoir 22. The valve control unit 32 includes a plurality of pumps 36 and each of the pumps 36 is in fluid communication with a respective one of the plurality of inputs 34. The plurality of pumps 36 includes a first pump 40 and a second pump 42 and the second pump is in fluid communication with the detergent reservoir 18 for pumping detergent. Furthermore, each of the first pump 40 and the second pump 42 may comprise an electric fluid pump or the like. The valve control unit 32 includes a supply valve 43 that is in fluid communication between respective ones of the plurality of inputs 34 and the first pump 40. The supply valve 43 is actuated into a first condition for placing the first pump 40 in fluid communication with the water reservoir 20 for pumping water. The supply valve 43 is actuated into a second condition for placing the first pump 40 in fluid communication with the paint reservoir 22 for pumping paint.

A robotic arm 44 is movably disposed on the roof 16 of the vehicle 12 and the robotic arm 44 is positionable in a variety of orientations with respect to the vehicle 12 thereby facilitating the robotic arm 44 to be directed toward a wall 46 when the vehicle 12 is parked next to the wall 46. The wall 46 may be an exterior wall of a building, for example, or other planar surface that has been defaced with graffiti 48. The robotic arm 44 comprises a drive unit 50 that is rotatably mounted to the roof 16 of the vehicle 12; the drive unit 50 is rotatable about a vertical axis with respect to the vehicle 12 and the drive unit 50 is electrically coupled to a power source 52 comprising an electrical system of the vehicle 12.

The robotic arm 44 includes a scissor 54 that has a lower arm 56 which is pivotally attached to an upper arm 58 and the lower arm 56 movably engages the drive unit 50. The scissor 54 is positionable in a stored position having the lower arm 56 extending laterally away from the drive unit 50 and having the upper arm 58 resting on the lower arm 56. Conversely, the scissor 54 is positionable in a deployed position having the lower arm 56 angling upwardly from the drive unit 50 and having the upper arm 58 angling upwardly from the lower arm 56. The scissor 54 may include electric motors, hydraulic actuators or other source of motion.

The robotic arm 44 includes a telescopic member 60 that has a first end 61 and a second end 62. The telescopic member 60 has a plurality of sections 63 which slidably engage each other such that the telescopic member 60 has a telescopically adjustable length. Additionally, the first end 61 is pivotally attached to a top end 64 of the upper arm 58 of the scissor 54. The robotic arm 44 includes a series of arms 66 and a respective one of the series of arms 66 is pivotally attached to the second end 62 of the telescopic member 60. The series of arms 66 is positionable in a variety of angles with respect to the telescopic arm thereby facilitating an endmost one 65 of the series of arms 66 to be positioned adjacent to the wall 46 near with the vehicle 12 is parked. The robotic arm 44 may include a plurality of servos, or other types of electromechanical actuators, that are integrated into the series of arms 66 to facilitate the series of arms 66 to be manipulated.

A service head 67 is pivotally attached to the robotic arm 44 thereby facilitating the service head 67 to be positioned adjacent to the wall 46 when the robotic arm 44 is directed toward the wall 46. The service head 67 has a scrub panel 68 that is oriented at an angle with a paint and spray panel 69. The scrub panel 68 is directed toward the wall 46 when the service head 67 is pivoted into a scrub position. Additionally, the paint and spray panel 69 is directed toward the wall 46 when the service head 67 is pivoted into a paint position.

The service head 67 includes a pair of support arms 70 that is each coupled to and extends away from a rear surface 71 of a respective one of the scrub panel 68 and the paint and spray panel 69. The pair of support arms 70 intersects each other at a pivot point 72 that is distally located with respect to the service head 67. The pivot point 72 pivotally engages a distal end 73 of the endmost arm 65 of the robotic arm 44 such that each of the scrub panel 68 and the paint and spray panel 69 lies on a plane that is positionable at a variety of angles with respect to the endmost arm 65. In this way a front surface 74 of each of the scrub panel 68 and the paint and spray panel 69 can be oriented to lie on a plane that is oriented parallel to the wall 46.

A scrubbing unit 75 is attached to the scrub panel 68 of service head 67. The scrubbing unit 75 has a rotating scrubbing element 76 which frictionally engages the wall 46 when the service head 67 is in the scrub position. In this way the rotating scrubbing element 76 can scrub graffiti 48 from the wall 46. The scrubbing unit 75 is in fluid communication with the detergent reservoir 18 for spraying the liquid detergent on the wall 46 to enhance scrubbing the graffiti 48 from the wall 46.

The scrubbing unit 75 comprises a scrub motor 77 that is attached to the scrub panel 68. The scrub motor 77 has an output shaft 78 extending through the scrub panel 68 and the scrub motor 77 alternately rotates in a first direction and a second direction when the scrub motor 77 is turned on. The scrubbing unit 75 includes a scrubbing puck 79 that has a back surface 80 which is attached to the output shaft 78 such that the back surface 80 is spaced from a forward surface 81 of the scrub panel 68. A front surface 82 of the scrubbing puck 79 has a well 83 extending toward the back surface 80 and the well 83 is centrally positioned on the front surface 82.

The scrubbing unit 75 includes a scrub disk 84 that has a front side 85 and a back side 86 and a screw 87 which is coupled to and extends away from the back side 86 of the scrub disk 84. The screw 87 threadably engages a bounding surface 88 of the well 83 in the front surface 82 of the scrubbing puck 79 having the back side 86 of the scrub disk 84 abutting the front surface 82 of the scrubbing puck 79 when the screw 87 is fully tightened. The scrubbing unit 75 includes a plurality of brushes 90 and each of the brushes 90 is coupled to and extends away from the front side 85 of the scrub disk 84. In this way each of the brushes 90 scrubs the wall 46 when the scrub motor 77 is turned on and the service head 67 is in the scrubbing position.

The scrubbing unit 75 includes a detergent outlet 91 which extends through scrub panel 68. The detergent outlet 91 is in fluid communication with the second pump 42 in the valve control unit 32 thereby facilitating the detergent outlet 91 to spray the detergent on the wall 46 when the service head 67 is in the scrubbing position. The scrubbing unit 75 includes a detergent valve 92 that is integrated into the detergent outlet 91. The detergent valve 92 is actuatable to varying degrees of flow rates thereby facilitating the detergent valve 92 to regulate the pressure of the detergent sprayed from the detergent outlet 91. The detergent valve 92 may comprise an electrically controlled fluid valve or the like.

The scrubbing unit 75 includes a water outlet 93 which extends through scrub panel 68. The water outlet 93 is in fluid communication with the water pump 38 in the valve control unit 32 thereby facilitating the water outlet 93 to spray the water on the wall 46 when the service head 67 is in the scrubbing position. The scrubbing unit 75 includes a water valve 94 that is integrated into the water outlet 91. The water valve 94 is actuatable to varying degrees of flow rates thereby facilitating the water valve 94 to regulate the pressure of the water sprayed from the water outlet 93. The water valve 94 may comprise an electrically controlled fluid valve or the like.

A vacuum port 95 extends through the scrub panel 68 and the vacuum port 95 is in fluid communication with the vacuum unit 24 thereby facilitating the vacuum port 95 to suctionally remove the detergent or water that is sprayed on the wall 46 when the service head 67 is in the scrubbing position. A scrub shroud 96 is attached to the scrub panel 68 and the scrub shroud 96 surrounds the scrubbing puck 79, the detergent outlet 91, the water outlet 93 and the vacuum port 95. The scrub shroud 96 is collapsible toward the scrub panel 68 and the scrub shroud 96 abuts the wall 46 when the service head 67 is in the scrub position for containing the detergent in the area surrounded by the scrub shroud 96.

A painting and spraying unit 97 is attached to the paint and spray panel 69 of the service head 67. The painting and spraying unit 97 has a plurality of paint elements 98 each directed toward the wall 46 when the service head 67 is in the painting position. Each of the plurality of paint elements 98 is in fluid communication with the paint reservoir 22 thereby facilitating the plurality of paint elements 98 to apply paint onto the wall 46 for covering the graffiti 48. Additionally, the painting and spraying unit 97 is in fluid communication with the water reservoir 20 for spraying the water onto the wall 46.

The painting and spraying unit 97 comprises a plurality of nozzles 99 and each of the plurality of nozzles 99 extends through the paint and spray panel 69. Each of the plurality of nozzles 99 is in fluid communication with the supply valve 43 in the valve control unit 32 thereby facilitating each of the plurality of nozzles 99 to receive the paint from the first pump 40 when the supply valve 43 is in the first condition. Each of the plurality of nozzles 99 is in fluid communication with the supply valve 43 in the valve control unit 32 thereby facilitating each of the plurality of nozzles 99 to receive the water from the first pump 40 when the supply valve 43 is in the second condition. Each of the plurality of nozzles 99 has a front end 100 that is open thereby facilitating the front end 100 of each of the plurality of nozzles 99 to spray the water or the paint onto the wall 46 when the service head 67 is in the painting position. The first pump 40 may comprise a high pressure fluid pump that is commonly associated with power washers that might be found in a car wash, for example. In this way the water can be delivered to the nozzles 99 at a pressure commonly associated with power washers.

The painting and spraying unit 97 includes a plurality of spray valves 102 and each of the plurality of spray valves 102 is fluidly attached to a respective one of the plurality of nozzles 99. Each of the plurality of spray valves 102 is actuatable to varying degrees of flow rates thereby facilitating the plurality of spray valves 102 to regulate the pressure of the water or paint sprayed from the plurality of nozzles 99. Additionally, the spray valves 102 in the paint and spray panel 69 may comprise electrically controlled fluid valves or the like.

The painting and spraying unit 97 includes a vacuum port 104 which extends through the paint and spray panel 69. The vacuum port 104 in the paint and spray panel 69 is fluidly attached to the vacuum unit 24 thereby facilitating the vacuum port 104 in the paint and spray panel 69 to suctionally remove water or the paint sprayed by the nozzles 99 in the paint and spray panel 69. The painting and spraying unit 97 includes a paint shroud 105 that is attached to the paint and spray panel 69 and the paint shroud 105 surrounds the plurality of nozzles 99 and the vacuum outlet 101. The paint shroud 105 is collapsible toward the paint and spray panel 69 and the paint shroud 105 abuts the wall 46 when the service head 67 is in the paint position for containing the water and the paint in the area surrounded by the paint shroud 105.

A control unit 106 is attached to the vehicle 12 and the control unit 106 is in electrical communication with vacuum unit 24, the air compressor 28, the valve control unit 32, the drive unit 50 of the robotic arm 44, the scrub motor 77, the detergent valve 92 in the scrubbing unit 75 and the plurality of spray valves 102 in the painting and spraying unit 97. The control unit 106 controls operational parameters of each of the aforementioned elements. A control cable 107 is coupled between the control unit 106 and the service head 67 and the control cable 107 includes a plurality of electrical conductors 108 that is each electrically coupled between the control unit 106 and respective ones of the aforementioned elements that is in electrical communication with the control unit 106. The control cable 107 includes a plurality of conduits 109 that is each is fluidly coupled between the valve control unit 32 and a respective one of the detergent valve 92 and the water valve 94 in the scrubbing unit 75 and the spray valves 102 in the painting and spraying unit 97.

A support panel 110 is provided which has an arm 111 extending downwardly and rearwardly from said support panel 110 to engage a hitch receiver 112 on the vehicle 12. In this way the support panel 110 lies on a horizontal plane to facilitate the service head 67 to rest on the support panel 110 when the scissor 54 of the robotic arm 44 is in the stored position and the series of arms 66 of the robotic arm 44 are folded into a stored position. A computer guidance system 113 is disposed within the vehicle 12 and the computer guidance system 113 is electrically coupled to the control unit 106 and the drive unit 50 of the robotic arm 44. A pair of proximity sensors 114 is each disposed on a respective one of the scrub panel 68 and the paint and spray panel 69 of the service head 67 and each of the proximity sensors 114 is electrically coupled to the control unit 106. Additionally, a camera 115 is removably attached to the service head 67 and the camera 115 is in communication with the computer guidance system 113 thereby facilitating imagery of the wall 46 to be viewed within the vehicle 12. The control unit 106 includes a direction stick 116 positioned within the vehicle 12 that is manipulated to control the robotic arm 44 and the service head 67 thereby facilitating the service head 67 to be positioned proximate the graffiti 48 that is to be removed.

In use, the vehicle 12 is driven to a location where graffiti 48 is present on the wall 46 and the direction stick 116 is manipulated to actuate the robotic arm 44 for positioning the service head 67 near the graffiti 48. Furthermore, the direction stick 116 is employed to select either the scrubbing unit 75 or the painting and spraying unit 97 to be actuated. The computer guidance system 113 subsequently employs imagery from the cameras 115 as well as data from the proximity sensors 114 to precisely position the either the scrubbing unit 75 or the painting and spraying unit 97, depending on which was selected, for either removing the graffiti 48 from the wall 46 or painting over the graffiti 48 on the wall 46. Furthermore, the robotic arm 44 has a reach of at least 15.0 meters to facilitate the service head 67 to reach locations that would be challenging to reach with either a ladder or a scaffold. The direction stick 116 is manipulated to place the service head 67 on the support panel 110 when the graffiti 48 is either removed or painted over and the vehicle 12 is driven to the next location.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word “comprising” is used in its non-limiting sense to mean that items following the word are included, but items not specifically mentioned are not excluded. A reference to an element by the indefinite article “a” does not exclude the possibility that more than one of the element is present, unless the context clearly requires that there be only one of the elements.

I claim:

1. A graffiti removal assembly for removing graffiti from a wall and subsequently painting the wall, said assembly comprising:

a vehicle having a cargo bay and a roof;

a robotic arm being movably disposed on said roof of said vehicle, said robotic arm being positionable in a variety of orientations with respect to said vehicle thereby facilitating said robotic arm to be directed toward a wall when said vehicle is parked next to the wall;

a service head being pivotally attached to said robotic arm thereby facilitating said service head to be positioned adjacent to the wall when said robotic arm is directed toward the wall, said service head having a scrub panel oriented at an angle with a paint and spray panel, said scrub panel being directed toward the wall when said service head is pivoted into a scrub position, said paint and spray panel being directed toward the wall when said service head is pivoted into a paint position;

a detergent reservoir being positioned within said cargo bay of said vehicle, said detergent reservoir containing a liquid detergent;

a paint reservoir being positioned within said cargo bay of said vehicle, said paint reservoir containing a liquid paint;

a scrubbing unit being attached to said scrub panel of service head, said scrubbing unit having a rotating scrub disk which frictionally engages the wall when said service head is in said scrub position wherein said rotating scrub disk is configured to scrub graffiti from the wall, said scrubbing unit being in fluid communication with said detergent reservoir for spraying the liquid detergent on the wall to enhance scrubbing the graffiti from the wall; and a painting and spraying unit being attached to said paint and spray panel of said service head, said painting and spraying unit having a plurality of nozzles being directed toward the wall when said service head is in said painting position, each of said plurality of nozzles being in fluid communication with said paint reservoir thereby facilitating said plurality of nozzles to apply paint onto the wall for covering the graffiti.

2. The assembly according to claim 1, further comprising:

a water reservoir being positioned within said cargo bay of said vehicle, said water reservoir containing water;

a vacuum unit being positioned within said cargo bay of said vehicle;

an air compressor being positioned within said cargo bay of said vehicle; and a filtration unit being positioned within said cargo bay of said vehicle.

3. The assembly according to claim 2, wherein:

said assembly includes a valve control unit being positioned within said cargo bay of said vehicle, said valve control unit having a plurality of inputs, each of said inputs of said valve control unit being in fluid communication with a respective one of said detergent reservoir and said water reservoir and said paint reservoir, said valve control unit including a plurality of pumps, each of said pumps being in fluid communication with a respective one of said plurality of inputs, said plurality of pumps including a first and a second pump; and said valve control unit includes a supply valve being in fluid communication between respective ones of said plurality of inputs and said first pump, said supply valve being actuatable into a first condition for placing said first pump in fluid communication with said water reservoir for pumping water, said supply valve being actuatable into a second condition for placing said first pump in fluid communication with said paint reservoir for painting paint.

4. The assembly according to claim 1, wherein said robotic arm comprises:

a drive unit being rotatably mounted to said roof of said vehicle, said drive unit being rotatable about a vertical axis with respect to said vehicle, said drive unit being electrically coupled to a power source comprising an electrical system of said vehicle;

a scissor being having a lower arm pivotally attached to an upper arm, said lower arm movably engaging said drive unit, said scissor being positionable in a stored position having said lower arm extending laterally away from said drive unit and having said upper arm resting on said lower arm, said scissor being positionable in a deployed position having said lower arm angling upwardly from said drive unit and having said upper arm angling upwardly from said lower arm;

a telescopic member having a first end and a second end, said telescopic member having a plurality of sections which slidably engage each other such that said telescopic member has a telescopically adjustable length, said first end being pivotally attached to a top end of said upper arm of said scissor; and a series of arms, a respective one of said series of arms being pivotally attached to said second end of said telescopic arm, said series of arms being positionable in a variety of angles with respect to said telescopic arm thereby facilitating an endmost one of said series of arms to be positioned adjacent to the wall near with said vehicle is parked.

5. The assembly according to claim 4, wherein said service head includes a pair of support arms each being coupled to and extending away from a rear surface of a respective one of said scrub panel and said paint and spray panel, said pair of support arms intersecting each other at a pivot point being distally located with respect to said service head, said pivot point pivotally engaging a distal end of said endmost arm of said robotic arm such that each of said scrub panel and said paint and spray panel lies on a plane being positionable at a variety of angles with respect to said endmost arm thereby facilitating a front surface of each of said scrub panel and said paint and spray panel to lie on a plane being oriented parallel to the wall.

6. The assembly according to claim 1, wherein said scrubbing unit comprises:

a scrub motor being attached to said scrub panel, said scrub motor having an output shaft extending through said scrub panel, said scrub motor alternately rotating in a first direction and a second direction when said scrub motor is turned on;

a scrubbing puck having a back surface being attached to said output shaft such that said back surface is spaced from said a forward surface of said scrub panel, a front surface of said scrubbing puck having a well extending toward said back surface, said well being centrally positioned on said front surface;

said scrub disk having a front side and a back side;

a screw being coupled to and extending away from said back side of said scrub disk, said screw threadably engaging a bounding surface of said well in said front surface of said scrubbing puck having said back side of said scrub disk abutting said front surface of said scrubbing puck when said screw is fully tightened; and a plurality of brushes, each of said brushes being coupled to and extending away from said front side of said scrub disk wherein each of said brushes is configured to scrub the wall when said scrub motor is turned on and said service head is in said scrubbing position.

7. The assembly according to claim 3, wherein said scrubbing unit includes:

a detergent outlet extending through scrub panel, said detergent outlet being in fluid communication with said second pump in said valve control unit thereby facilitating said detergent outlet to spray the detergent on the wall when said service head is in said scrubbing position;

a detergent valve being integrated into said detergent outlet, said detergent valve being actuatable to varying degrees of flow rates thereby facilitating said detergent valve to regulate the pressure of the detergent sprayed from said detergent outlet;

a water outlet extending through scrub panel, said water outlet being in fluid communication with said water pump in said valve control unit thereby facilitating said water outlet to spray the water on the wall when said service head is in said scrubbing position; and a water valve being integrated into said water outlet, said water valve being actuatable to varying degrees of flow rates thereby facilitating said water valve to regulate the pressure of the water sprayed from said water outlet.

8. The assembly according to claim 2, wherein said scrubbing unit includes:

a detergent outlet extending through said scrub panel;

a water outlet extending through said scrub panel;

a vacuum port extending through said scrub panel, said vacuum port being in fluid communication with said vacuum unit thereby facilitating said vacuum port to suctionally remove the detergent or water that is sprayed on the wall when said service head is in said scrubbing position; and a scrub shroud being attached to said scrub panel, said scrub shroud surrounding said scrub puck and said detergent outlet and said water outlet and said vacuum port, said scrub shroud being collapsible toward said scrub panel, said scrub shroud abutting the wall when said service head is in said scrub position for containing the detergent and the water in the area surrounded by said scrub shroud.

9. The assembly according to claim 3, wherein each of said plurality of nozzles extends through said paint and spray panel, each of said plurality of nozzles being in fluid communication with said supply valve in said valve control unit thereby facilitating each of said plurality of nozzles to receive the paint or water from said first pump, each of said plurality of nozzles having a front end being open thereby facilitating said front end of each of said plurality of nozzles to spray the paint or the water onto the wall when said service head is in said painting position.

10. The assembly according to claim 9, wherein said painting and spraying unit includes a plurality of spray valves, each of said plurality of spray valves being fluidly attached to a respective one of said plurality of nozzles, each of said plurality of spray valves being actuatable to varying degrees of flow rates thereby facilitating said plurality of spray valves to regulate the pressure of the paint sprayed from said plurality of nozzles.

11. The assembly according to claim 9, wherein said painting and spraying unit includes a vacuum port extending through said paint and spray panel, said vacuum port in said paint and spray panel being fluidly attached to said vacuum unit thereby facilitating said vacuum port in said paint and spray panel to suctionally remove the water or paint sprayed by said nozzles in said paint and spray panel.

12. The assembly according to claim 11, wherein said painting and spraying unit includes a paint shroud being attached to said paint and spray panel, said paint shroud surrounding said plurality of nozzles and said vacuum port, said paint shroud being collapsible toward said paint and spray panel, said paint shroud abutting the wall when said service head is in said paint position for containing the water and the paint in the area surrounded by said paint shroud.

13. The assembly according to claim 3, wherein:

said scrubbing unit includes a scrub motor and a detergent valve;

said painting and spraying unit includes a plurality of spray valves; and said assembly includes a control unit being attached to said vehicle, said control unit being in electrical communication with vacuum unit and said air compressor and said valve control unit and said drive unit of said robotic arm and said scrub motor and said detergent valve in said scrubbing unit and said plurality of spray valves in said painting and spraying unit, said control unit controlling operational parameters of each of said aforementioned elements.

14. The assembly according to claim 13, further comprising a control cable being coupled between said control unit and said service head, said control cable including a plurality of electrical conductors each being electrically coupled between said control unit and respective ones of said aforementioned elements in electrical communication with said control unit, said control cable including a plurality of conduits each being fluidly coupled between said valve control unit and a respective one of said detergent valve in said scrubbing unit and said spray valves in said painting and spraying unit.

15. A graffiti removal assembly for removing graffiti from a wall and subsequently painting the wall, said assembly comprising:

a vehicle having a cargo bay and a roof;

a detergent reservoir being positioned within said cargo bay of said vehicle, said detergent reservoir containing a liquid detergent;

a water reservoir being positioned within said cargo bay of said vehicle, said water reservoir containing water;

a paint reservoir being positioned within said cargo bay of said vehicle, said paint reservoir containing a liquid paint;

a vacuum unit being positioned within said cargo bay of said vehicle;

an air compressor being positioned within said cargo bay of said vehicle;

a filtration unit being positioned within said cargo bay of said vehicle;

a valve control unit being positioned within said cargo bay of said vehicle, said valve control unit having a plurality of inputs, each of said inputs of said valve control unit being in fluid communication with a respective one of said detergent reservoir and said water reservoir and said paint reservoir, said valve control unit including a plurality of pumps, each of said pumps being in fluid communication with a respective one of said plurality of inputs, said plurality of pumps including a water pump and a paint pump and a second pump, said valve control unit includes a supply valve being in fluid communication between respective ones of said plurality of inputs and said first pump, said supply valve being actuatable into a first condition for placing said first pump in fluid communication with said water reservoir for pumping water, said supply valve being actuatable into a second condition for placing said first pump in fluid communication with said paint reservoir for painting paint;

a robotic arm being movably disposed on said roof of said vehicle, said robotic arm being positionable in a variety of orientations with respect to said vehicle thereby facilitating said robotic arm to be directed toward a wall when said vehicle is parked next to the wall, said robotic arm comprising:

a drive unit being rotatably mounted to said roof of said vehicle, said drive unit being rotatable about a vertical axis with respect to said vehicle, said drive unit being electrically coupled to a power source comprising an electrical system of said vehicle;

a scissor being having a lower arm pivotally attached to an upper arm, said lower arm movably engaging said drive unit, said scissor being positionable in a stored position having said lower arm extending laterally away from said drive unit and having said upper arm resting on said lower arm, said scissor being positionable in a deployed position having said lower arm angling upwardly from said drive unit and having said upper arm angling upwardly from said lower arm;

a telescopic member having a first end and a second end, said telescopic member having a plurality of sections which slidably engage each other such that said telescopic member has a telescopically adjustable length, said first end being pivotally attached to a top end of said upper arm of said scissor; and a series of arms, a respective one of said series of arms being pivotally attached to said second end of said telescopic arm, said series of arms being positionable in a variety of angles with respect to said telescopic arm thereby facilitating an endmost one of said series of arms to be positioned adjacent to the wall near with said vehicle is parked;

a service head being pivotally attached to said robotic arm thereby facilitating said service head to be positioned adjacent to the wall when said robotic arm is directed toward the wall, said service head having a scrub panel oriented at an angle with a paint and spray panel, said scrub panel being directed toward the wall when said service head is pivoted into a scrub position, said paint and spray panel being directed toward the wall when said service head is pivoted into a paint position, said service head including a pair of support arms each being coupled to and extending away from a rear surface of a respective one of said scrub panel and said paint and spray panel, said pair of support arms intersecting each other at a pivot point being distally located with respect to said service head, said pivot point pivotally engaging a distal end of said endmost arm of said robotic arm such that each of said scrub panel and said paint and spray panel lies on a plane being positionable at a variety of angles with respect to said endmost arm thereby facilitating a front surface of each of said scrub panel and said paint and spray panel to lie on a plane being oriented parallel to the wall;

a scrubbing unit being attached to said scrub panel of service head, said scrubbing unit having a rotating scrub disk which frictionally engages the wall when said service head is in said scrub position wherein said rotating scrub disk is configured to scrub graffiti from the wall, said scrubbing unit being in fluid communication with said water reservoir for spraying water on the wall to enhance scrubbing the graffiti from the wall, said scrubbing unit being in fluid communication with said detergent reservoir for spraying the liquid detergent on the wall to enhance scrubbing the graffiti from the wall, said scrubbing unit comprising:

a scrub motor being attached to said scrub panel, said scrub motor having an output shaft extending through said scrub panel, said scrub motor alternately rotating in a first direction and a second direction when said scrub motor is turned on;

a scrubbing puck having a back surface being attached to said output shaft such that said back surface is spaced from said a forward surface of said scrub panel, a front surface of said scrubbing puck having a well extending toward said back surface, said well being centrally positioned on said front surface;

the scrub disk having a front side and a back side;

a screw being coupled to and extending away from said back side of said scrub disk, said screw threadably engaging a bounding surface of said well in said front surface of said scrubbing puck having said back side of said scrub disk abutting said front surface of said scrubbing puck when said screw is fully tightened;

a plurality of brushes, each of said brushes being coupled to and extending away from said front side of said scrub disk wherein each of said brushes is configured to scrub the wall when said scrub motor is turned on and said service head is in said scrubbing position;

a detergent outlet extending through scrub panel, said detergent outlet being in fluid communication with said second pump in said valve control unit thereby facilitating said detergent outlet to spray the detergent on the wall when said service head is in said scrubbing position;

a detergent valve being integrated into said detergent outlet, said detergent valve being actuatable to varying degrees of flow rates thereby facilitating said detergent valve to regulate the pressure of the detergent sprayed from said detergent outlet;

a water outlet extending through scrub panel, said water outlet being in fluid communication with said water pump in said valve control unit thereby facilitating said water outlet to spray the water on the wall when said service head is in said scrubbing position; and a water valve being integrated into said water outlet, said water valve being actuatable to varying degrees of flow rates thereby facilitating said water valve to regulate the pressure of the water sprayed from said water outlet;

a vacuum port extending through said scrub panel, said vacuum port being in fluid communication with said vacuum unit thereby facilitating said vacuum port to suctionally remove the detergent or water that is sprayed on the wall when said service head is in said scrubbing position; and a scrub shroud being attached to said scrub panel, said scrub shroud surrounding said scrub puck and said detergent outlet and said water outlet and said vacuum port, said scrub shroud being collapsible toward said scrub panel, said scrub shroud abutting the wall when said service head is in said scrub position for containing the detergent and water in the area surrounded by said scrub shroud;

a painting and spraying unit being attached to said paint and spray panel of said service head, said painting and spraying unit having a plurality of nozzles being directed toward the wall when said service head is in said painting position, each of said plurality of nozzles being in fluid communication with said paint reservoir thereby facilitating said plurality of nozzles to apply paint onto the wall for covering the graffiti, said painting and spraying unit being in fluid communication with said water reservoir for spraying the water onto the wall, said painting and spraying unit comprising:

each of said plurality of nozzles extending through said paint and spray panel, each of said plurality of nozzles being in fluid communication with said supply valve in said valve control unit thereby facilitating each of said plurality of nozzles to receive the paint or water from said first pump, each of said plurality of nozzles having a front end being open thereby facilitating said front end of each of said plurality of nozzles to spray the water or paint onto the wall when said service head is in said painting position;

a plurality of spray valves, each of said plurality of spray valves being fluidly attached to a respective one of said plurality of nozzles, each of said plurality of spray valves being actuatable to varying degrees of flow rates thereby facilitating said plurality of spray valves to regulate the pressure of the water or paint sprayed from said plurality of nozzles;

a vacuum port extending through said paint and spray panel, said vacuum port in said paint and spray panel being fluidly attached to said vacuum unit thereby facilitating said vacuum port in said paint and spray panel to suctionally remove the water or paint sprayed by said detergent outlet in said paint and spray panel; and a paint shroud being attached to said paint and spray panel, said paint shroud surrounding said plurality of nozzles and said vacuum port, said paint shroud being collapsible toward said paint and spray panel, said paint shroud abutting the wall when said service head is in said paint position for containing the water and the paint in the area surrounded by said paint shroud;

a control unit being attached to said vehicle, said control unit being in electrical communication with vacuum unit and said air compressor and said valve control unit and said drive unit of said robotic arm and said scrub motor and said detergent valve in said scrubbing unit and said plurality of spray valves in said painting and spraying unit, said control unit controlling operational parameters of each of said aforementioned elements; and a control cable being coupled between said control unit and said service head, said control cable including a plurality of electrical conductors each being electrically coupled between said control unit and respective ones of said aforementioned elements in electrical communication with said control unit, said control cable including a plurality of conduits each being fluidly coupled between said valve control unit and respective ones of said detergent valve in said scrubbing unit and said spray valves in said painting and spraying unit.

* * * * *